(12) United States Patent
Holler

(10) Patent No.: US 7,177,083 B2
(45) Date of Patent: Feb. 13, 2007

(54) DISPLAY DEVICE WITH ELECTROOPTICAL FOCUSSING

(75) Inventor: Frank Holler, Aalen (DE)

(73) Assignee: Carl-Zeiss-Stiftung Trading AS, Heidenheim (DE)

( * ) Notice: Subject to any disclaimer, the term of this patent is extended or adjusted under 35 U.S.C. 154(b) by 0 days.

(21) Appl. No.: 10/779,963

(22) Filed: Feb. 17, 2004

(65) Prior Publication Data

US 2004/0165284 A1 Aug. 26, 2004

(30) Foreign Application Priority Data

Feb. 17, 2003 (DE) ................................ 103 06 578

(51) Int. Cl.
  *G02B 27/14* (2006.01)
  *G02B 27/10* (2006.01)
  *G03B 21/14* (2006.01)

(52) U.S. Cl. ...................... 359/630; 359/618; 359/629; 353/28

(58) Field of Classification Search ................ 359/566, 359/630, 465, 472, 618, 629; 353/28, 34, 353/7; 345/7, 9; 349/13, 11, 200
See application file for complete search history.

(56) References Cited

U.S. PATENT DOCUMENTS 4,802,746 A * 2/1989 Baba et al. .................. 359/667
5,359,444 A * 10/1994 Piosenka et al. ............... 349/13
5,886,822 A * 3/1999 Spitzer ........................ 359/630

6,379,009 B1 * 4/2002 Fergason ....................... 353/28

FOREIGN PATENT DOCUMENTS

JP 04273211 A 9/1992

(Continued)

OTHER PUBLICATIONS

"Modally Addressed Liquid Crystals," University of Durham (6 pgs.).

(Continued)

*Primary Examiner*—Audrey Y. Chang
(74) *Attorney, Agent, or Firm*—Patterson, Thuente, Skaar & Christensen, P.A.

(57) ABSTRACT

A display device is provided for generating an image which is perceivable, by a viewer (M) of an object located in an object plane (O), as being superimposed on the object, said device comprising an image generating device (1) for generating the image in an image plane (B) and a superimposing unit (7), wherein the image generating device (1) and the superimposing unit (7) are mounted on a support device (12), which is placeable on the head of the viewer (M), and the image generating device (1) comprises a focusing unit (3) by which the distance from the image plane (B) to the support device (12) is changeable and which includes a lens (4) having a variable refractive index as well as a control unit (6) for adjusting the refractive index of the lens (4), wherein, when the support device (12) is placed on the head of the viewer (M), the superimposing unit (7) effects superposition of the generated image on the object for the viewer (M) and the control unit (6) adjusts the refractive index of the lens (4) such that the object plane (O) coincides with the image plane (B).

30 Claims, 2 Drawing Sheets

FOREIGN PATENT DOCUMENTS

| | | |
|---|---|---|
| JP | 07333552 A | 12/1995 |
| JP | 08160347 A | 6/1996 |
| JP | 09331552 A | 12/1997 |
| WO | WO 98/18039 | 4/1998 |

OTHER PUBLICATIONS

"Modal Liquid Crystal Lenses," Okotech Delft, Netherlands (3 pgs.).

Naumov et al, "Liquid-crystal adaptive lenses with modal control," Optics Letters vol. 23, No. 13, Jul. 1, 1998 (pp. 992-994).

* cited by examiner

DISPLAY DEVICE WITH ELECTROOPTICAL FOCUSSING

This application claims priority to German Application No. 10306578.4 filed Feb. 17, 2003. Said application is incorporated by reference herein.

BACKGROUND OF THE INVENTION

The invention relates to a display device for generating an image which is perceivable, by a viewer of an object located in an object plane, as being superimposed on the object.

Such a device is, for example, an HMD device (Head Mounted Display Device), wherein superposition of the generated image on the object is often referred to as an augmented representation.

There are HMD devices which lack a focusing unit allowing adjustment of the distance from the generated image to the viewer. Such devices are difficult to use particularly for presbyopic older viewers who have a reduced power to accommodate.

Further, HMD devices are known which include a focusing unit to adjust the distance from the generated image to the viewer. However, for this purpose, at least one sufficiently big adjustment knob needs to be provided in the HMD device in order to manually displace lenses and/or an imaging element. If the HMD device is adapted to focus automatically, there is the inescapable additional requirement of a motor drive. This makes the HMD device heavy and cumbersome.

In view thereof, it is an object of the invention to provide a potentially lighter and smaller display device for generating an image which is perceivable, by a viewer of an object located in an object plane, as being superimposed on the object.

SUMMARY OF THE INVENTION

The object is achieved by a display device for generating an image which is perceivable, by a viewer of an object located in an object plane, as being superimposed on the object, said device comprising an image generating device for generating the image in an image plane and a superimposing unit, wherein the image generating device and the superimposing unit are mounted on a support device, which is placeable on the head of the viewer, and the image generating device comprises a focusing unit by which the distance from the image plane to the support device is variable and which includes a lens having a variable refractive index as well as a control unit for adjusting the refractive index of the lens, wherein, when the support device is placed on the head of the viewer, the superimposing unit effects superposition of the generated image on the object for the viewer and the control unit adjusts the refractive index of the lens such that the object plane coincides with the image plane.

Since the display device according to the invention is provided with a lens having a variable or adjustable refractive index, the position of the image plane may be varied and adjusted without requiring mechanical movements of lenses or other elements. As a result, there is no need to provide an adjustemnt knob or a motor drive for mechanically moving the lens, so that the display device may be of a smaller and lighter overall design. The adjusted refractive index may be the same for the entire lens or may also differ (in which case, there is a desired distribution of the refractive index).

A lens, as it is understood herein, is an optical element by means of which optical imaging can be effected (i.e. the path of rays coming from an object point is changed by means of the lens such that they pass through a different point, the image point). In particular, the lens may be provided as a Fresnel lens or as a diffractive optical element. Examples of such lenses are found in the articles "Modal Liquid Crystal Lenses" by Okotech Delft, Netherlands, and "Modally Addressed Liquid Crystals" by the University of Durham. The coincidence of the object and image planes, as understood herein, means that the maximum distance between both planes is such that the viewer may simultaneously perceive the object and the image as sharp. Preferably, both planes do actually coincide.

In particular, the display device may comprise a measurement module mounted on the support device, said measurement module detecting the distance from the object plane to the support device, with the refractive index of the lens being adjusted as a function of the distance detected by said measurement module. The detection of the distance by means of the measurement module may be carried out directly or indirectly. This means that either the distance is directly determined or a quantity is determined from which the distance could be derived. The indirect determination of the distance does not even require a concrete distance value to be determined itself, but it suffices if an adjustment of the refractive index of the lens is possible due to the detected quantity, so that the object plane coincides with the image plane.

This embodiment allows easy automatic "focusing" of the generated image in the object plane.

In particular, the focusing unit may be provided as an autofocusing unit which changes the refractive index upon a change in the distance between the object plane and the support device in such a manner that the image plane still coincides with the object plane. This ensures that the viewer always sees the generated image in the object plane (even if it is moving, for example), imparting very good usability to the device.

A preferred embodiment of the display device according to the invention consists in that the lens is formed, at least partially, of an electrooptical material, in particular liquid crystal. Such lenses are economical in manufacture, so that an inexpensive display device may be provided.

In the display device according to the invention, the control unit for adjusting the refractive index of the lens may apply a predetermined electrical voltage to the lens. This is easily and accurately realizable.

This is particularly advantageous in the use of liquid crystals, wherein use may be made, for example, of nematic liquid crystals (twisted and non-twisted forms) and also of ferroelectric liquid crystals. These liquid crystals allow a change in the refractive index of up to 0.2 to be achieved already at low voltages (for example, 2 to 10 volts) and at a very low energy consumption. These low voltages (and also the low energy consumption) are realizable in a simple manner and with a low weight (e.g. using one or more batteries or by means of at least one solar cell), so that the weight of the display device may be kept low.

The nematic liquid crystal lenses have the advantage that they exhibit good properties particularly in the temperature range of from 20 to 50° C. A particular advantage of the ferroelectric liquid crystals is the very quick switching time and, thus, the very quick change in the refractive index.

Further, the superimposing unit of the display device may comprise a mirror, a splitter mirror or a splitter grating. If it comprises a mirror, superposition takes place in such a manner that the viewer may perceive the generated image and the object as being arranged next to one another or as immediately adjacent to one another. In superposition by means of the splitter mirror, the generated image and the object may be placed upon one another for the viewer. Of course, it is also possible that the superimposing unit comprises a combination of a mirror and a splitter mirror, so that the viewer may perceive, in part, a superposition and, in part, a representation wherein the object and the image are located next to each other.

A further advantage of the display device according to the invention consists in that an infinitely variable adjustment is possible and that also no moving parts are required to displace the image plane.

In the display device according to the invention, when the support device is placed on the head, the measurement module preferably detects the distance between the support device and the object plane by means of the viewer's eye. This may be realized, for example, by measuring the fundus oculi of the viewer. In this type of distance detection, the required distance may be quickly and precisely determined without having to detect the object or the corresponding part of the object which the viewer is presently perceiving. Further, in this variant, the viewer may even wear variable focus glasses.

Alternatively, it is possible that, in the display device according to the invention, when the support device is placed on the head, the measurement module may detect the distance between the object plane and the support device on the basis of the object itself. This has the advantage that the correct distance between the viewer and the object may always be determined, regardless of short-term eye and/or lid movements. Further, when detecting said distance, the object may be filmed and may also be evaluated in connection with the image to be generated. Thus, during maintenance of equipment, for example, it is possible to present suitable information to the viewer by means of the generated image in a corresponding manner, on the basis of the area of the equipment (or of the object) which the viewer is presently viewing. Said information may be mounting instructions or notices with regard to values to be checked.

In a preferred embodiment of the display device according to the invention, the image generating device comprises an image module for imaging as well as, when the support device is placed on the head, a projection beam path from the image module via the focusing unit to the viewer's eye, and the measurement module comprises a sensor as well as, in the projection beam path between the image module and the lens, a beam-splitting unit which directs light coming from the object and passing through the lens onto the sensor, which emits a signal to the control unit, as a function of how sharp the image of the object on the sensor is, wherein the image generating device and the measurement module are designed such that, when focusing the object for the sensor by adjustment of the refractive index of the lens, the image plane simultaneously coincides with the object plane. This allows a compact and light display device to be provided, wherein the focusing of the image in the object plane (image plane coincides with object plane) may be effected in an uncomplicated manner.

As the image module, a luminous display, such as a background-illuminated LCD or an LED, may be used. Of course, use may be made also of non-luminous displays. In this case, the image module may be what is called a (spatial) light valve (for example, a tilting mirror matrix comprising a plurality of tilting mirrors arranged in lines and columns and individually controllable), which is illuminated and selectively reflects light (as a function of the position of the individual tilting mirrors), the combination of which then yields the generated image. The image module may generate monochromatic or also polychromatic images.

In a preferred embodiment of the display device according to the invention, the focusing unit comprises two or more lenses having variable refractive indices, which refractive indices may be set or adjusted by means of the control unit.

The display device according to the invention may be provided such that it is designed for one or both of the viewer's eyes. If it is designed for both of the viewer's eyes, the images may be the same or different for both eyes. In particular, a spatial representation of the image is possible.

BRIEF DESCRIPTION OF THE DRAWINGS

The invention is explained in more detail below, essentially by way of example, with reference to the drawings, wherein.

DETAILED DESCRIPTION OF THE PREFERRED EMBODIMENTS

Figure 2:
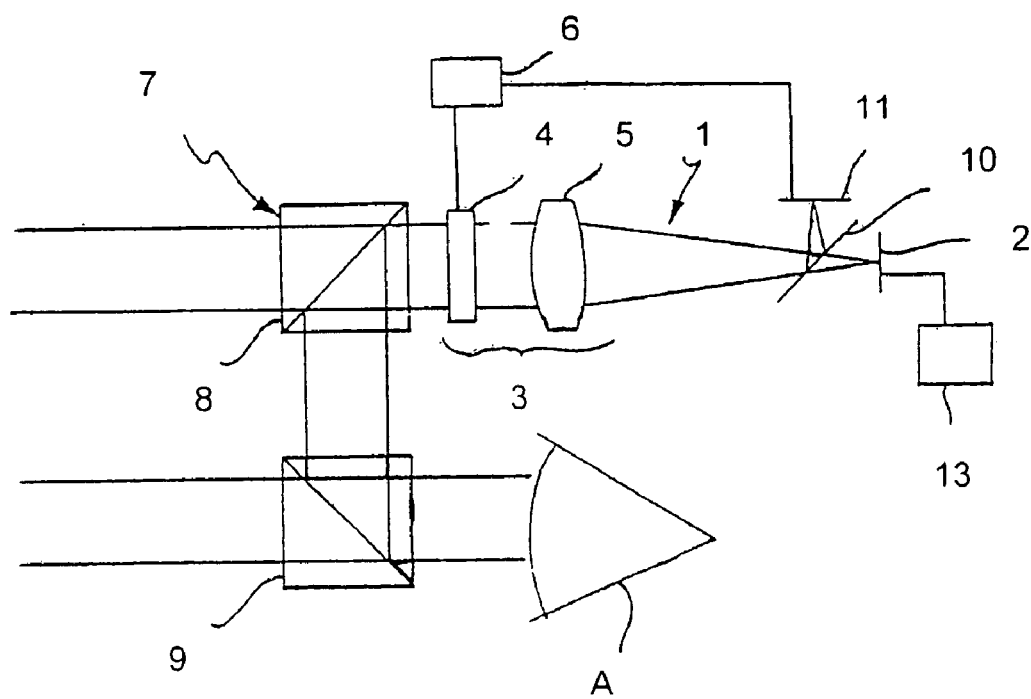

As is evident particularly from FIG. 2, the display device in the described embodiment comprises an imaging unit 1 with an image module 2 (in this case, a luminous display) and a focusing unit 3.

The focusing unit 3 comprises a liquid crystal lens 4 as well as a further lens 5, wherein an electric voltage may be applied to said liquid crystal lens 4 by means of a control unit 6 of the display device. Depending on the magnitude of the voltage applied, a predetermined refractive index or distribution of the refractive index is adjusted for the liquid crystal lens 4.

The display device further includes a superimposing unit 7 which comprises first and second beam-splitter cubes 8, 9. Said splitter cubes 8, 9 are arranged such that the light coming from the image module 2 is deflected by 90° by the first splitter cube and impinges on the second splitter cube 9, which in turn effects a deflection by 90°. The light deflected by the second splitter cube 9 then impinges on the eye A of the viewer M. The viewer M may perceive his environment through the second splitter cube 9. In the example described herein, he is viewing an object (not shown) which is located in the object plane O. Instead of the splitter cubes 8, 9, other beam splitters known to the skilled person may be used as well.

Further, the display device also comprises a measurement module including a beam splitter 10, which is arranged between the image module 2 and the focusing unit 3, and an autofocus sensor 11. The beam splitter 10 is arranged such that light from the object which passes through the first splitter cube 8 and through the focusing unit 3 is deflected onto the autofocus sensor 11 by the beam splitter 10. Depending on how sharp the image of the object on the autofocus sensor 11 is, the latter emits a signal which is applied to the control unit 6.

The image generating device 1, the focusing unit 3 as well as the superimposing unit 7 are all mounted on a support device 12 (shown only in FIG. 1) which may be placed on the head in the manner of glasses such that, in the mounted condition thereof, the viewer perceives his environment through the second splitter cube 9.

The control unit 6 may be mounted on the support device 12. However, it may also be provided separately thereof. Image control unit 13, which is used to control the image module 2 may also be provided separately. Therefore, the control unit 6 as well as the image control unit 13 are not shown in FIG. 1, because they are not mounted on the support device 12 in the described example. The connections between the image control unit 13 and the image module 2 as well as between the control unit 6 and the lens 4 as well as the autofocus sensor 11 may be realized in a wireless manner (e.g. by radio links) and by means of electrical lines.

The optical design of the display device is selected such that, if it is found by the autofocus sensor 11 that the viewer M is perceiving the object in the object plane O as sharp, the image plane B in which the generated image is perceivable by the viewer M, coincides with the object plane O. Focusing on the object plane O is achieved by a suitable adjustment of the refractive index of the liquid crystal lens 4, which is done as a function of the signal or of the value of the signal emitted by the autofocus sensor 11. Thus, there is a closed loop by which the distance from the object to the support device 12 is detected. Said distance detection is provided such that the image plane B is thereby already placed in the object plane O as well. The determination of the distance from the object to the support device 12 (or to the viewer M) by means of selective adjustment of the refractive index of the liquid crystal lens 4 is, thus, also used already to make the image plane B coincide with the object plane O.

In particular, the control unit 6 and the measurement module are designed such that they constantly determine the distance between the object plane O and the viewer M and accordingly readjust or adjust the refractive index of the liquid crystal lens 4. Thus, autofocusing is provided by which the viewer M can always sharply perceive the generated image in the object plane O. This autofocus function advantageously requires no mechanically movable parts.

In a further embodiment (not shown) of the display device, the focusing unit comprises two or more liquid crystal lenses whose refractive indices are adjustable by means of the control unit.

Instead of the second splitter cube 9, a deflecting mirror (not shown) may also be used. In doing so, the deflecting mirror is dimensioned such that only part of the visual field is covered by the deflecting mirror. In this case, the superposition of the generated image on the perceivable object is a side-by-side superposition.

Figure 1:
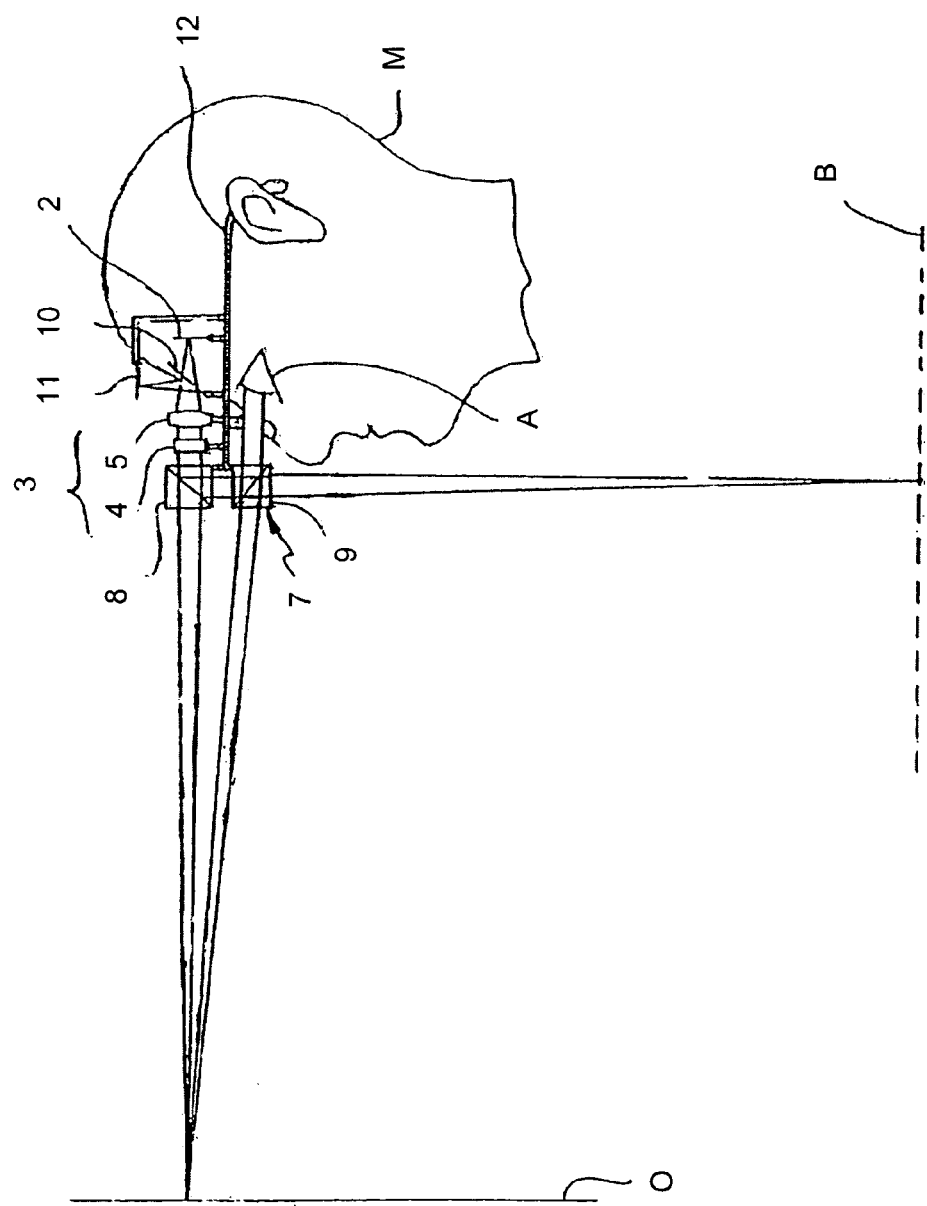
FIG. 1 schematically shows a lateral view of the display device according to the invention, mounted on the head of a viewer, and FIG. 2 schematically shows an enlarged view of the display device of FIG. 1.

The display device described in combination with FIGS. 1 and 2 is provided for only one eye A of the viewer M. Of course, it may also be provided for both eyes. This may be realized, for example, by accordingly expanding the superimposing unit 7. Of course, a separate imaging unit, a separate focusing unit comprising a measurement module and a separate superimposing unit may be provided for the second eye, too.

Although the description above contains many specificities, these should not be construed as limiting the scope of the invention but as merely providing illustrations of some of the presently preferred embodiments of the invention. Thus, the scope of the invention should be determined by the appended claims and their legal equivalents, rather than by the examples given.

The invention claimed is:

1. A display device for generating an image perceivable by a viewer as being superimposed on an object located in an object plane, said device comprising:
    an image generating device for generating the image projected to an image plane and
    a superimposing unit,
    the image generating device and the superimposing unit being mounted on a head wearable support device, and
    the image generating device comprising
    a variable focusing unit by which the distance from the image plane to the support device is adjustable, the variable focusing unit comprising a lens having a variable refractive index located in an optical path between the image generating device and the viewer and a control unit for adjusting the refractive index of the lens, the control unit applying a variable electrical signal to the variable refractive lens to alter the refractive index of the lens and to consequently vary the focusing power of the lens;
    the superimposing unit comprising a first beam splitter and a second beam splitter wherein, said first beam splitter deflects light coming from the image generating device to said second beam splitter which in turn deflects the light to the viewer, and wherein the light coming from the object is transmitted through said second beam splitter to the viewer,
    a measurement module that receives light coming from the object that passes through the first beam splitter and senses the object located in the object plane from the received light;
    wherein, when the support device is worn on the head of the viewer, the superimposing unit superimposes the generated image in a field of view including the object as seen by the viewer and the control unit adjusts the electrical signal applied to the variable refractive index lens to alter the refractive index of the lens to focus the image based on a signal from the measurement module, such that the image plane substantially coincides with the object plane and the object and the image are seen as simultaneously substantially equally focused by the user when the user accommodates to focus the object.

2. The display device as claimed in claim 1, in which the measurement module is operably connected to the support device, said measurement module detecting a distance from the object plane to the support device, and wherein the refractive index of the lens is adjusted as a function of the distance detected by said measurement module.

3. The display device as claimed in claim 1, wherein the variable focusing variable unit comprises an autofocusing unit that alters the refractive index of the lens in response to a change in the distance between the object plane and the support device such that the image plane is maintained coincident with the object plane.

4. The display device as claimed in claim 1, wherein the lens is formed, at least partially, of an electro-optical material.

5. The display device as claimed in claim 4, wherein the electro-optical material comprises liquid crystal.

6. The display device as claimed in claim 1, wherein the control unit for adjusting the refractive index of the lens applies a predetermined electrical voltage to the lens.

7. The display device as claimed in claim 1, wherein the superimposing unit comprises a mirror, a splitter mirror or a splitter grating.

8. The display device as claimed in claim 1, wherein, when the support device is placed on the head, the measurement module detects the distance between the support device and the object plane by sensing an eye of the viewer.

9. The display device as claimed in claim 1, in which the measurement module, when the support device is placed on the head, detects the distance between the object plane and the support device by sensing the object.

10. The display device as claimed in claim 1, wherein the image generating device comprises an image module for image generation and a projection beam path from the image module via the variable focusing unit to the eye of the viewer when the support device is placed on the head, and further comprising said measurement module comprising a sensor and a beam-splitter unit which directs light coming from the object and passing through the lens onto the sensor in the projection beam path between the image module and the lens, the sensor emitting a signal to the control unit as a function of how sharp the image of the object on the sensor is, wherein the image generating device and the measurement module are structured such that, when the object is sharply imaged onto the sensor by adjustment of the refractive index of the lens, the image plane coincides with the object plane.

11. A method of generating an image perceivable by a viewer as being superimposed in a field of view including an object located in an object plane, the method comprising the steps of:
mounting an image generating device and a superimposing unit on a head wearable support device, the superimposing unit comprising a first beam splitter and a second beam splitter, wherein said first beam splitter deflects light coming from the image generating device to said second beam splitter which in turn deflects the light to the viewer, and wherein the light coming from the object is transmitted through said second beam splitter to the viewer and wherein light from the object is received by a measurement module after the light has passed through the first bean splitter,
generating an image and projecting the image to an image plane;
sensing a sharpness of the object via the measurement module;
focusing the image via a variable refractive index lens based on a signal from the measurement module, the variable refractive index lens being located between the image generating device and the viewer; and
adjusting the refractive index of the lens with a control unit that applies a variable electrical signal to the variable refractive lens to alter the refractive index of the lens and to consequently vary the focusing power of the lens based on a signal from the measurement module such that the image plane substantially coincides with the object plane such that the object and the image are seen as simultaneously substantially equally focused by the user when the user accommodates to focus the object.

12. The method as claimed in claim 11, further comprising the steps of detecting a distance form the object plane to the support device and adjusting the refractive index of the lens as a function of the distance detected.

13. The method as claimed in claim 11, further comprising the step of utilizing an autofocus unit to alter the refractive index of the lens in response to a change in the distance between the object plane and the support device to maintain the image plane coincident with the object plane.

14. The method as claimed in claim 11, further comprising the step of forming the lens at least in part from an electro-optical material.

15. The method as claimed in claim 14, wherein the electro-optical material comprises liquid crystal.

16. The method as claimed in claim 11, further comprising the step of applying a predetermined electrical voltage to the lens to alter the refractive index.

17. The method as claimed in claim 11, further comprising the step of superimposing the image plane and the object plane utilizing a mirror, a splitter mirror or a splitter grating.

18. The method as claimed in claim 11, further comprising the step of detecting the distance between the support device and the object plane by sensing an eye of the viewer.

19. The method as claimed in claim 11, further comprising the step of detecting the distance between the support device and the object plane by sensing the object.

20. The method as claimed in claim 11, further comprising the steps of:
directing light from the from the object through the lens into said measurement module comprising a beam splitter and a sensor;
directing a portion of the light from the beam splitter onto the sensor;
emitting a signal from the sensor to said control unit as a function of the sharpness of an image formed on the sensor; and
structuring the measurement module such that when the object is sharply imaged on the sensor by adjustment of the refractive index of the lens the image plane coincides with the object plane.

21. A method of generating an image perceivable by a viewer as being superimposed in a field of view including an object located in an object plane, the method comprising the steps of:
mounting an image generating device and a superimposing unit on a head wearable support device, the superimposing unit comprising a first beam splitter and a second beam splitter wherein, said first beam splitter deflects light coming from the image generating device to said second beam splitter which in turn deflects the light to the viewer, and wherein the light coming from the object is transmitted through said second beam splitter to the viewer;
receiving light from the object at an autofocus sensor along a first beam path passing through the first beam splitter;
sensing a sharpness of an image of the object with the autofocus sensor;
receiving light from the object at the viewer's eye along a second independent beam path substantially adjacent the first beam path, passing through the second beam splitter;
generating an image in an image plane;
focusing the image via a variable refractive index lens;
applying an electrical signal to the variable refractive index lens with a control unit that applies a variable electrical signal to the variable refractive lens to alter the refractive index of the lens and to consequently vary the focusing power of the lens and
adjusting the refractive index of the lens with said control unit based on a signal from the autofocus sensor such that the image plane coincides with the object plane whereby the image is superimposed on or adjacent the object and seen by the viewer as focused when the viewer is fixating on the object and the user accommodates to focus the object.

22. The method as claimed in claim 21, further comprising the steps of detecting a distance from the object plane to the support device and adjusting the refractive index of the lens as a function of the distance detected.

23. The method as claimed in claim 21, further comprising the step of utilizing an autofocus unit to alter the refractive index of the lens in response to a change in the distance between the object plane and the support device to maintain the image plane coincident with the object plane.

24. The method as claimed in claim 21, further comprising the step of forming the lens at least in part from an electro-optical material.

25. The method as claimed in claim 24, wherein the electro-optical material comprises liquid crystal.

26. The method as claimed in claim 21, further comprising the step of applying a predetermined electrical voltage to the lens to alter the refractive index.

27. The method as claimed in claim 21, further comprising the step of superimposing the image plane and the object plane utilizing a minor, a splitter mirror or a splitter grating.

28. The method as claimed in claim 21, further comprising the step of detecting the distance between the support device and the object plane by sensing an eye of the viewer.

29. The method as claimed in claim 21, further comprising the step of detecting the distance between the support device and the object plane by sensing the object.

30. The method as claimed in claim 21, further comprising the steps of:

directing light from the from the object through the lens into a measurement module comprising a beam splitter and said autofocus sensor;

directing a portion of the light from the beam splitter onto the autofocus sensor;

emitting a signal from the autofocus sensor to said control unit as a function of the sharpness of an image formed on the autofocus sensor; and structuring the measurement module such that when the object is sharply imaged on the sensor by adjustment of the refractive index of the lens the image plane coincides with the object plane.

* * * * *